United States Patent [19]

Takeuchi et al.

[11] Patent Number: 4,699,835
[45] Date of Patent: Oct. 13, 1987

[54] FLEXIBLE MAGNETIC DISK AND METHOD OF MAKING SAME

[75] Inventors: Motoki Takeuchi; Junichi Nakamura, both of Tokyo, Japan

[73] Assignee: Fuji Photo Film Co., Ltd., Japan

[21] Appl. No.: 795,441

[22] Filed: Nov. 6, 1985

[30] Foreign Application Priority Data

Nov. 9, 1984 [JP] Japan .................................. 59-236020

[51] Int. Cl.⁴ .............................................. G11B 5/72
[52] U.S. Cl. ........................................ 428/65; 427/44;
427/54.1; 427/128; 427/131; 427/132; 427/289;
428/137; 428/195; 428/212; 428/694; 428/695;
428/900
[58] Field of Search ................ 427/44, 54.1, 128, 131,
427/289, 132; 428/694, 695, 64, 65, 900, 137,
195, 212; 360/134–136

[56] References Cited

U.S. PATENT DOCUMENTS

| 3,466,156 | 9/1969 | Peters | 427/132 |
| 3,681,225 | 8/1972 | Genma | 427/132 |
| 4,239,828 | 12/1980 | Knope | 428/64 |
| 4,335,183 | 6/1982 | Hosaka | 428/694 |
| 4,368,239 | 1/1983 | Nakajima | 428/900 |
| 4,387,114 | 7/1983 | Conner | 427/54.1 |
| 4,404,247 | 9/1983 | Dominquez-Burquette | 428/64 |
| 4,434,210 | 2/1984 | Nakajima | 427/44 |
| 4,486,500 | 12/1984 | Naruo | 425/54.1 |
| 4,523,246 | 6/1985 | Okuzawa | 428/694 |
| 4,539,220 | 9/1985 | Martinelli | 427/54.1 |
| 4,578,299 | 3/1986 | Kato | 428/65 |
| 4,581,270 | 4/1986 | Kato | 428/65 |
| 4,647,473 | 3/1987 | Kato | 428/65 |
| 4,652,480 | 3/1987 | Kato | 428/65 |

*Primary Examiner*—Ellis P. Robinson
*Attorney, Agent, or Firm*—Gerald J. Ferguson, Jr.; Michael P. Hoffman; Ronni S. Malamud

[57] ABSTRACT

A flexible magnetic disk is provided with a protective layer at the peripheral edge portion of the circular hole in the center of a magnetic disk sheet. The protective layer is formed by applying a radiation-polymerizable composition to the peripheral edge portion of the circular hole in the center of the magnetic disk sheet by letterpress printing, and exposing the composition to a radiation to cure the composition.

5 Claims, 9 Drawing Figures

FIG. IA
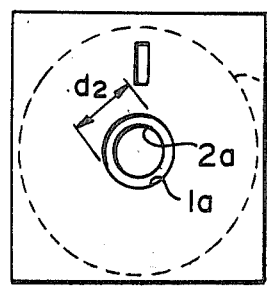
FIG. IB
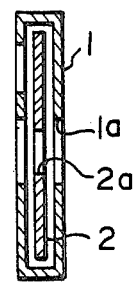
FIG. 2
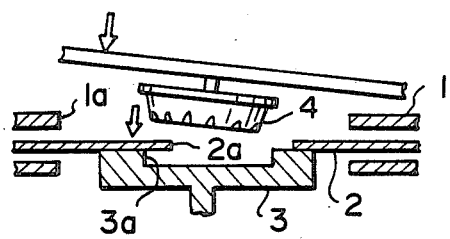
FIG. 3
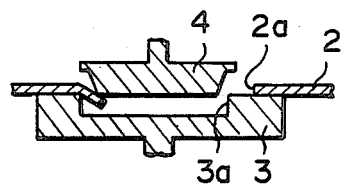
FIG. 4
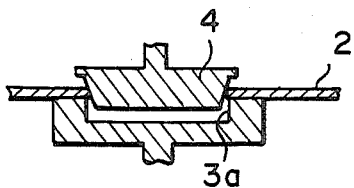

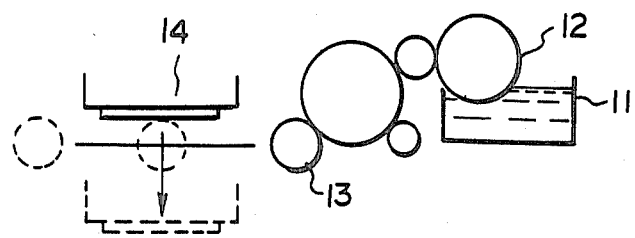
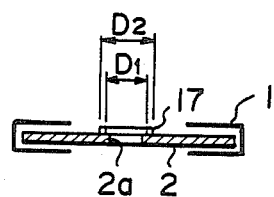
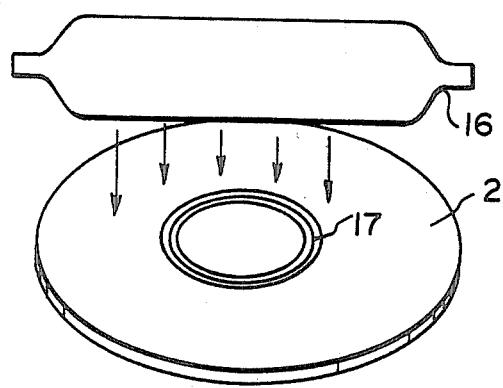
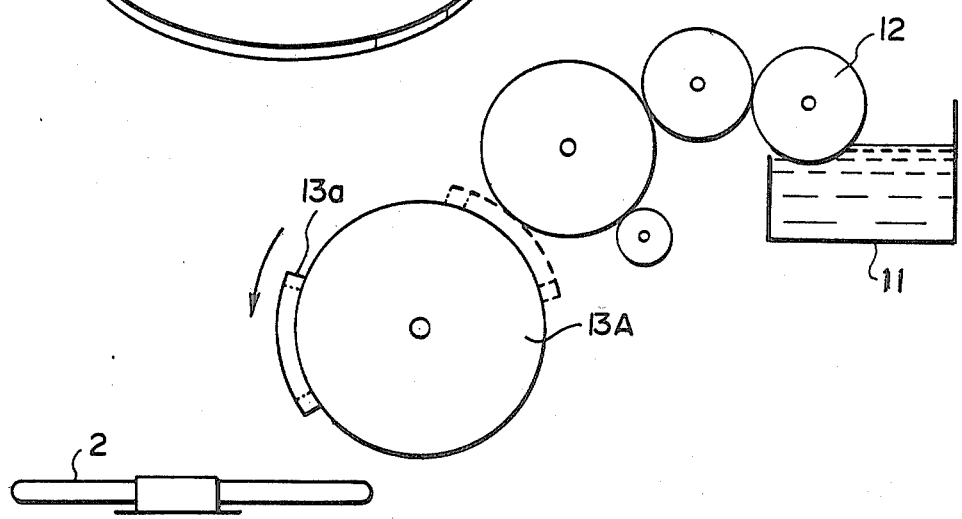

FLEXIBLE MAGNETIC DISK AND METHOD OF MAKING SAME

BACKGROUND OF THE INVENTION

1. Field of the Invention

This invention relates to a flexible magnetic disk and a method of making it. This invention particularly relates to a flexible magnetic disk provided with a protective layer at the peripheral edge portion of the circular hole in the center of the flexible magnetic disk, and a method of making it.

2. Description of the Prior Art

Conventionally, flexible magnetic disks comprising a jacket and a flexible magnetic disk sheet housed therein are used for magnetic recording and reproducing. The jacket and the sheet have circular holes at the centers thereof for engagement with sheet positioning members of an information writing apparatus or an information read-out apparatus. The sheet is rotated by a rotatable section of the sheet positioning members for magnetically recording information on the sheet or for magnetically reproducing information from the sheet. In the magnetic disk of this type, since the sheet is housed in the jacket in slightly spaced relation to the jacket, the position of the sheet sometimes deviates from the center of the jacket during storage, handling or carrying of the magnetic disk. When the magnetic disk is loaded into a writing apparatus or a read-out apparatus in this condition, the circular hole at the center of the sheet is positioned eccentrically with respect to the sheet positioning members (collet and rotatable section) of the apparatus. Thus the sheet is held in an eccentric position, and it becomes impossible to correctly write information into the sheet or to correctly read information out of the sheet.

FIG. 1A is a plan view showing an example of the flexible magnetic disk, and FIG. 1B is a sectional view of the flexible magnetic disk shown in FIG. 1A. The flexible magnetic disk comprises a rectangular jacket 1 having a circular aperture 1a in the center, and a flexible magnetic disk sheet 2 having a circular hole 2a in the center. The magnetic disk sheet 2 is rotatably housed in the jacket 1 so that the peripheral edge portion of the circular hole 2a of the magnetic disk sheet 2 is exposed within the circular aperture 1a of the jacket 1.

FIG. 2 is a partially sectional view showing the condition of loading the flexible magnetic disk between sheet positioning members in a writing apparatus or a read-out apparatus. FIG. 3 is a partially sectional view showing the condition of the flexible magnetic disk sheet of the flexible magnetic disk held in an eccentric position with respect to the sheet positioning members in a writing apparatus or a read-out apparatus. FIG. 4 is a partially sectional view showing the condition of the flexible magnetic disk sheet of the flexible magnetic disk correctly positioned by the sheet positioning members in a writing apparatus or a read-out apparatus.

As shown in FIG. 2, when the aforesaid flexible magnetic disk is loaded into a writing apparatus or a read-out apparatus, a rotatable section 3 of the sheet positioning members is contacted with the magnetic disk sheet 2 from below, and a collet 4 of the sheet positioning members is moved down and fitted into a circular recess 3a of the rotatable section 3. However, the peripheral edge portion of the circular hole 2a of the sheet 2 is not always aligned with the peripheral edge portion of the circular recess 3a of the rotatable section 3, but instead often deviates from the peripheral edge portion of the circular recess 3a. As shown in FIG. 3, when the collet 4 is moved down in this condition, a part of the peripheral edge portion of the circular hole 2a of the sheet 2 is sandwiched between the collet 4 and the peripheral edge portion of the circular recess 3a of the rotatable section 3. As a result, the sheet 2 is held eccentrically with respect to the rotatable section 3 and the collet 4, and rotated in this condition in the writing apparatus or in the read-out apparatus. Such positioning of the sheet 2 must be avoided since writing of information into the sheet 2 and read-out of information therefrom are not conducted correctly unless the sheet 2 is rotated with the center thereof exactly aligned with the rotation axis. Further, when the sheet 2 is rotated in the eccentrically held condition, flatness of the sheet 2 is adversely affected, and the sheet 2 is subject to flapping motion during rotation. In order that the sheet 2 be correctly positioned on the peripheral edge portion of the circular recess 3a, as shown in FIG. 4, as the collet 4 is moved down, it is desired that the coefficient of friction of the sheet 2 with respect to the rotatable section 3 and the collet 4 be low.

In order to solve the aforesaid problem, it has been proposed, for example, in U.S. Pat. No. 4,052,750, to adhere a reinforcement ring to the peripheral edge portion of the circular hole in the center of the magnetic disk sheet. However, in this method, the adhesive oozes out and stains the collet during long use of the flexible magnetic disk.

Accordingly, it was also proposed, for example, in U.S. Pat. No. 4,387,114 to reinforce the peripheral edge portion of the circular hole in the center of a magnetic disk sheet by transferring an ultraviolet-curing resin to the peripheral edge portion of the circular hole in the center of the magnetic disk sheet by pad printing, and curing the resin to form a protective layer.

In this method, though the problem of oozing out of the adhesive is solved, the process becomes complicated since the ultraviolet-curing resin must once be put on a pad and then transferred to the flexible magnetic disk sheet.

SUMMARY OF THE INVENTION

The primary object of the present invention is to provide a flexible magnetic disk provided with a protective layer at the peripheral edge portion of a circular hole in the center of the magnetic disk sheet so that the coefficient of friction of the magnetic disk sheet with respect to sheet positioning members of a writing apparatus or a read-out apparatus is low and the magnetic disk is loaded at the correct position in the apparatus.

Another object of the present invention is to provide a method of forming the protective layer at the peripheral edge portion of the circular hole in the center of the flexible magnetic disk sheet at low cost.

The specific object of the present invention is to provide a method of accurately forming the protective layer at the peripheral edge portion of the circular hole in the center of the flexible magnetic disk sheet.

A further object of the present invention is to provide a continuous, quick and efficient printing method for forming the protective layer.

The present invention provides a flexible magnetic disk provided with a protective layer at the peripheral edge portion of a circular hole in the center of the flexible magnetic disk sheet, said protective layer being formed by applying a radiation-polymerizable composition by letterpress printing and curing said radiation-polymerizable composition by exposure to a radiation.

The present invention also provides a method of making a flexible magnetic disk, which comprises the steps of: applying a radiation-polymerizable composition to the peripheral edge portion of a circular hole in the center of a flexible magnetic disk sheet by letterpress printing, and then exposing said radiation-polymerizable composition to a radiation, thereby curing said radiation-polymerizable composition and forming a protective layer.

The protective layer may be formed in a doughnut shape having an inner diameter larger than the diameter of the circular hole in the center of the flexible magnetic disk sheet, and an outer diameter smaller than the diameter of a circular aperture in the center of a jacket for housing the magnetic disk sheet.

The flexible magnetic disk provided with a protective layer in accordance with the present invention exhibits a small coefficient of friction of the peripheral edge portion of the circular hole in the center, and is smoothly and correctly loaded into a disk drive apparatus.

Also, in the method of making the flexible magnetic disk in accordance with the present invention, it is possible to form the protective layer accurately and efficiently at the peripheral edge portion of the circular hole in the center of the flexible magnetic disk sheet.

By using the letterpress printing process in accordance with the present invention, it becomes possible to obtain a flexible magnetic disk provided with the protective layer at the peripheral edge portion of the circular hole in the center of the flexible magnetic disk sheet and exhibiting a small coefficient of friction with respect to sheet positioning members. It also becomes possible to form the protective layer at low cost. Further, it becomes possible to form the protective layer at a speed higher than in the method wherein the pad printing process is used.

BRIEF DESCRIPTION OF THE DRAWINGS

FIG. 1A is a plan view showing an example of the flexible magnetic disk,

FIG. 1B is a sectional view showing the flexible magnetic disk of FIG. 1A,

FIG. 2 is a partially sectional view showing the condition of loading the flexible magnetic disk between sheet positioning members in an information writing apparatus or an information read-out apparatus, FIG. 3 is a partially sectional view showing the condition of the flexible magnetic disk sheet of the flexible magnetic disk held in an eccentric position with respect to the sheet positioning members in an information writing apparatus or an information read-out apparatus, FIG. 4 is a partially sectional view showing the condition of the flexible magnetic disk sheet of the flexible magnetic disk correctly positioned by the sheet positioning members in an information writing apparatus or an information read-out apparatus, FIG. 5 is a side view showing an example of a letterpress printing apparatus, FIG. 6 is an explanatory view showing the protective layer applied by letterpress printing, FIG. 7 is an explanatory view showing the step of exposure to a radiation emitted by a mercury vapor lamp after letterpress printing, and FIG. 8 is a side view showing another example of the letterpress printing apparatus.

DETAILED DESCRIPTION OF THE INVENTION

In general, in the letterpress printing process, an ink on a reservoir roll is transferred to several transfer rolls and then to a letterpress, and the letterpress is pressed against a paper or cloth sheet for printing. The process is described in detail in "Kogyo Daijiten" (Grand Industrial Dictionary) published by Heibonsha, Japan, in 1959.

The reservoir roller feeds the ink to the transfer rollers, and the transfer rollers extend the ink uniformly. In general, rubber, a resin or a metal is used as the material of the letterpress.

In the present invention, by "letterpress printing" is meant the process of applying a radiation-polymerizable resin composition on the reservoir roll to the peripheral edge portion of the circular hole in the center of the flexible magnetic disk sheet by printing via the transfer rollers and the letterpress. Then, the printed resin composition is cured by exposure to a radiation to form a protective layer at the peripheral edge portion of the circular hole in the center of the flexible magnetic disk sheet. Or, the radiation-polymerizable composition may be continuously applied by letterpress printing to predetermined positions on a web and may be cured with a radiation. Then, the cured resin composition may be punched in a disk-like shape and applied to the peripheral edge portion of the circular hole in the center of the magnetic disk sheet. Printing may also be conducted with the flexible magnetic disk sheet housed in a jacket. In this case, the flexible magnetic disk sheet is first housed in the jacket and adjusted to a predetermined position, and then a protective layer is applied by letterpress printing to the peripheral edge portion of the circular hole in the center of the magnetic disk sheet.

In the present invention, the radiation may be ultraviolet rays which are a low energy radiation, or may be $\alpha$-rays, $\beta$-rays, X-rays or cathode rays which are a high energy radiation. Among these radiations, ultraviolet rays are preferable since the radiation generating unit is simple.

As the resin composition polymerizable with ultraviolet rays, an ultraviolet ink may be used.

The ultraviolet ink is a compound containing one or more unsaturated carbon-carbon bonds, such as a compound containing acryloyl group, acrylamide group, allyl group, vinyl ether group or vinyl thioether group, or an unsaturated polyester thereof. Specifically, the ultraviolet ink may be methyl acrylate or acrylic acid alkyl ester as a homologue thereof, styrene or a homologue thereof such as $\alpha$-methylstyrene or $\beta$-chlorostyrene, acrylonitrile, vinyl acetate, vinyl propionate, or the like. The ultraviolet ink may contain two or more unsaturated bonds in a molecule. Examples of such a compound are described in "Light-sensitive Resin Data", Sogo Kagaku Kenkyusho, Japan, pp. 235–236, December 1968. Particularly, unsaturated esters of polyols such as ethylene diacrylate, diethylene glycol diacrylate, glycerol triacrylate, ethylene diacrylate, and pentaerythritol tetraacrylate, and glycidil diacrylates having epoxy ring are preferable. A mixture of a compound having one unsaturated bond in the molecule with a compound having two such bonds may also be used.

The above enumerated compounds may be of high molecular weight. Particularly preferable such compounds are those having acrylate group at the terminal of the main chain or at the side chain of the high-molecular chain as described, for example, in "Fatipec Congress", A. Vrancken, Vol. 11, 19 (1972). For example, the compound expressed by the formula

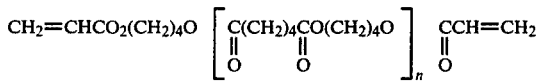

may be used. The polyester skeleton may be a polyurethane skeleton, an epoxy resin skeleton, a polyether skeleton, a polycarbonate skeleton, or a mixture of two or more of these skeletons. Though the molecular weight is not limited, it should preferably be within the range of 1,000 to 20,000. The above enumerated monomers and polymers may be mixed with each other.

Ultraviolet polymerization of the above listed compounds is possible only when a photopolymerization initiator is used.

The photopolymerization initiator may be an aromatic ketone such as benzophenone, benzoin ethyl ether, benzyl methyl ketal, 1-hydroxycyclohexyl phenyl ketone, or Michler's ketone. The photopolymerization initiator should preferably exhibit a comparatively large extinction coefficient at wavelengths of 254 nm, 313 nm and 365 nm, at which the line spectrum of the mercury vapor lamp normally used as the ultraviolet ray source arises.

As the photopolymerization initiator, Irgacure 651 commercially available from Ciba Geigy A.G. may be used.

The ultraviolet ink used in the present invention may be added with a deforming agent, wax, a leveling agent, a lubricating agent, a thixotropic agent, a stabilizing agent, or the like as an auxiliary agent. The viscosity of the ultraviolet ink should preferably be within the range of 5 cps to 500 ps, more preferably within the range of 1 ps to 200 ps.

As shown in FIG. 6, the printing dimensions should satisfy the conditions:

Printing inner diameter $D1 >$ Diameter $d1$ of circular hole in the center of magnetic disk sheet Printing outer diameter $D2 <$ Diameter $d2$ of aperture in the center of jacket In order to prevent oozing out of the ink to the circular hole in the center of the magnetic disk sheet during printing and to prevent the dimension of the circular hole from changing after curing of the ink due to oozing out of the ink, the printing dimension must satisfy the condition $D1 > d1$, and should preferably satisfy the condition $0.5 \text{ mm} < (D1-d1) < 2 \text{ mm}$.

The thickness of the protective layer should preferably be as small as possible to increase the positional accuracy of the floppy disk recording region and should preferably be sufficient to assure the strength of the circular hole in the center of the flexible magnetic disk sheet. Thus the thickness of the protective layer should preferably be within the range of 2 μm to 20 μm.

FIG. 7 is an explanatory view showing the step of curing the radiation-polymerizable resin composition 17 printed in the ring shape, by exposure to a radiation. In the case where ultraviolet rays are used as the radiation, a mercury vapor lamp 16 is used.

As the lamp, a super-high pressure, high pressure, medium pressure or low pressure mercury vapor lamp, a xenon lamp, metal halide lamp or the like may be used. Among these lamps, the high pressure mercury vapor lamp exhibiting large line spectrum intensity at 254 nm, 313 nm or 365 nm is most preferable.

Mercury vapor lamps come in an ozone type generating ozone and an ozone-less type which does not generate ozone. The ozone type exhibiting high intensity at a short wavelength (300 nm or less) is more preferable. The lamp output at the light emitting section should preferably be within the range of 10 to 200 W/cm, and should most preferably be 80 W/cm. The exposure distance should preferably be within the range of 10 cm to 30 cm and should be such that the magnetic disk sheet is not deformed by heat.

In order to eliminate thermal deformation of the magnetic disk sheet, a heat-preventing filter may be used between the lamp and the magnetic disk sheet, a cooling fan may be used at the printing surface, or a water-cooled lamp may be used. It is also possible to use a heat-preventing type reflecting cold mirror as a lamp mirror. As the heat-preventing filter, a quartz filter or a long-wave cut filter may be used. The exposure time should preferably be 5 seconds or shorter.

The method of the present invention will be described with reference to FIG. 5.

An ink is transferred from a liquid reservoir 11 to a transfer roller 13 via a liquid feed roller 12, and then transferred to a plate 14. The ink is then printed on a flexible magnetic disk sheet.

Or, as shown in FIG. 8, a letterpress 13a may be stuck on a transfer roller 13A, and rotation of the transfer roller 13A and movement of a flexible magnetic disk sheet 2 may be synchronized so that the letterpress 13a contacts and prints on the peripheral edge portion of the circular hole in the center of the flexible magnetic disk sheet 2.

In this manner, as shown in FIG. 6, a doughnot-shaped protective layer 17 is applied to the peripheral edge portion of a circular hole 2a in the center of the flexible magnetic disk sheet 2.

Thereafter, as shown in FIG. 7, before or after the flexible magnetic disk sheet 2 is inserted into a jacket 1, the protective layer 17 is exposed to a radiation emitted by the mercury vapor lamp 16 to harden the ink applied by the letterpress printing.

EXAMPLE

An ink having the composition described below was transferred to the transfer roller 13 and the letterpress as shown in FIG. 5, and printed on the magnetic disk sheet 2 as shown in FIG. 6. The printing inner diameter D1 was 30 mm, and the printing outer diameter D2 was 36 mm. Ultraviolet Ink Composition Urethane acrylate "M-1100" (supplied by Toagosei Chemical Industry Co., Ltd.): 100 parts by weight "Irgacure 651" as a photopolymerization initiator (supplied by Ciba Geigy A.G.): 5 parts by weight Myristic acid-modulated silicone "TA-930" as a lubricant (supplied by Shin-Etsu Chemical Co., Ltd.): 5 parts by weight Within one minute after printing, the printed ink layer was exposed to a radiation for 1 second by using an ozone type high-pressure mercury vapor lamp "HI-20N" (80 W/cm, 2 kW, supplied by Japan Storage Battery Co., Ltd.) at a distance of 20 cm (FIG. 7). In order to protect the magnetic disk sheet from heat, a heat-preventing quartz filter and a cooling fan were used. The ink film thickness was 6μ after curing.

As a comparative example, a magentic disk sheet having no protective layer was used.

With respect to the magnetic disk sheet obtained in the example in accordance with the present invention and the magnetic disk sheet of the comparative example, the coefficient of friction between the magnetic disk sheet and the upper positioning member was measured and a disk drive loading test was conducted at 25° C., 80% RH. The results are shown in the table below.

The coefficent of friction was measured by rubbing the positioning member (collet) against the magnetic disk sheet at a feed rate of 0.8 mm/second and a load of 70 gwt. Also, the coefficient of friction with respect to the positioning member (rotatable section) was measured in the same manner.

In the disk drive loading test, "YD-280" and "YD-380" supplied by Y-E Data Co., "JA751" and "JA561" supplied by Matsushita Tsushin Kogyo K.K., "M-2894" and "M-4853" supplied by Mitsubishi Electric Corp. were used as the disk drive unit.

Loading of the magnetic disk sheet to the disk drive units was repeated 10 times. In the table below, "o" indicates that no loading failure arose for any of the disk drive units, and "x" indicates that a loading failure arose for one or more disk drive units.

TABLE

| Measuring conditions | 25° C. 80% R H | | |
|---|---|---|---|
| Measured item | Coefficient of friction (μ) | | |
| Example | With respect to collet | With respect to rotatable section | Loading to disk drive unit |
| Example in accordance with present invention | 0.30 | 0.20 | o |
| Comparative | 0.56 | 0.42 | x |

We claim:

1. A flexible magnetic disk provided with a protective layer at the peripheral edge portion of a circular hole in the center of a flexible magnetic disk sheet, said protective layer having a small coefficient of friction, and being formed by applying a radiation-polymerizable composition by letterpress printing and curing said radiation-polymerizable composition by exposure to a radiation, wherein said protective layer is formed in a doughnut shape having an inner diameter larger than the diameter of the circular hole in the center of the flexible magnetic disk sheet, and an outer diameter smaller than the diameter of the circular aperture in the center of a jacket for housing the magnetic disk sheet, and wherein said protective layer covers only the peripheral edge portion of said circular hole.

2. A method of making a flexible disk, which comprises the steps of: applying a radiation-polymerizable composition to a substrate web by letterpress printing, exposing said letterpress-printed composition to a radiation to cure said composition, punching said web into a doughnut shaped piece, and applying said piece to the peripheral edge portion of a circular hole in the center of a flexible magnetic disk sheet, thereby forming a protective layer having a small coefficient of friction, wherein said protective layer is formed in a doughnut shape having an inner diameter larger than the diameter of said circular hole in the center of said flexible magnetic disk sheet, and and outer diameter smaller than the diameter of the circular aperture in the center of a jacket for housing said magnetic disk sheet.

3. A method of making a flexible magnetic disk, which comprises the steps of: applying a radiation-polymerizable composition to only the peripheral edge portion of a circular hole in the center of a flexible magnetic disk sheet by letterpress printing, and then exposing said radiation-polymerizable composition to a radiation, thereby curing said radiation-polymerizable composition and forming a protective layer having a small coefficient of friction, wherein said protective layer is formed in a doughnut shape having an inner diameter larger than the diameter of said circular hole in the center of said flexible magnetic disk sheet, and an outer diameter smaller than the diameter of a circular aperture in the center of a jacket for housing said magnetic disk sheet.

4. A method as defined in claim 3 wherein said letterpress printing is conducted only on the peripheral edge portion of the circular hole in the center of said flexible magnetic disk sheet exposed from a circular aperture in the center of a jacket after said flexible magnetic disk sheet is housed in said jacket.

5. A method as defined in claim 3 or 4 wherein said exposure to the radiation is conducted on said letterpress-printed composition exposed from a circular aperture in the center of a jacket after said flexible magnetic disk sheet is housed in said jacket.

* * * * *